United States Patent
Liang et al.

(10) Patent No.: US 9,684,636 B2
(45) Date of Patent: Jun. 20, 2017

(54) AD BLOCKING PAGE DISPLAY METHOD AND DEVICE

(71) Applicant: UC MOBILE LIMITED, Beijing (CN)

(72) Inventors: Jie Liang, Beijing (CN); Wenping Luo, Beijing (CN)

(73) Assignee: UC MOBILE LIMITED, Beijing (CN)

(*) Notice: Subject to any disclaimer, the term of this patent is extended or adjusted under 35 U.S.C. 154(b) by 247 days.

(21) Appl. No.: 14/387,698

(22) PCT Filed: May 31, 2013

(86) PCT No.: PCT/CN2013/076595
§ 371 (c)(1),
(2) Date: Sep. 24, 2014

(87) PCT Pub. No.: WO2013/178094
PCT Pub. Date: Dec. 5, 2013

(65) Prior Publication Data
US 2015/0082151 A1    Mar. 19, 2015

(30) Foreign Application Priority Data
May 31, 2012    (CN) .......................... 2012 1 0177700

(51) Int. Cl.
*G06F 17/00* (2006.01)
*G06F 17/21* (2006.01)
(Continued)

(52) U.S. Cl.
CPC .......... *G06F 17/212* (2013.01); *G06F 17/227* (2013.01); *G06F 17/272* (2013.01);
(Continued)

(58) Field of Classification Search
CPC .. G06F 17/227; G06F 17/2705; G06F 17/272; G06F 17/30905; G06F 17/2247;
(Continued)

(56) References Cited

U.S. PATENT DOCUMENTS 8,527,504 B1 * 9/2013 Krishnamurthy . G06F 17/30905
707/722
8,819,109 B1 * 8/2014 Krishnamurthy . G06F 17/30905
709/203

(Continued)

FOREIGN PATENT DOCUMENTS

CN    101094135 A    12/2007
CN    102436455 A    5/2012
CN    102722563 A    10/2012

OTHER PUBLICATIONS

CSS for Blockin' Stuff CSS-Tricks, Dated Jun. 22, 2010, https://css-tricks.com/css-for-blockin-stuff/.*

(Continued)

*Primary Examiner* — Cesar Paula
*Assistant Examiner* — David Faber
(74) *Attorney, Agent, or Firm* — Anova Law Group, PLLC

(57) ABSTRACT

The present invention discloses a page display method and device. The method comprises: in response to a click operation on a browser by a user, updating, by the browser, a current page display rule according to parameters downloaded from a server corresponding to the browser, and classifying and parsing the updated display rule; receiving, by the browser, a text from a target page, wherein the text contains a tag string used for displaying the target page; when the browser parses a predetermined tag string in the tag strings, invoking, by the browser, the classified and parsed page display rule corresponding to the predetermined tag string to display the page. The technical solution according to the present invention accelerates the display speed of a target page, thus saving network traffic and improving the user experience.

14 Claims, 5 Drawing Sheets

(51) Int. Cl.
*G06F 17/22* (2006.01)
*G06F 17/27* (2006.01)
*G06F 17/30* (2006.01)

(52) U.S. Cl.
CPC ...... *G06F 17/30905* (2013.01); *G06F 17/211* (2013.01); *G06F 17/218* (2013.01); *G06F 17/2247* (2013.01); *G06F 17/2705* (2013.01); *G06F 17/30861* (2013.01)

(58) Field of Classification Search
CPC .... G06F 17/211; G06F 17/212; G06F 17/218; G06F 17/30861; G06Q 17/02; G06Q 30/02; G06Q 30/0277; G06Q 30/0241
See application file for complete search history.

(56) References Cited

U.S. PATENT DOCUMENTS

| | | | | |
|---|---|---|---|---|
| 2004/0006609 | A1* | 1/2004 | Skrepetos | G06F 17/30867 709/220 |
| 2004/0019523 | A1* | 1/2004 | Barry | G06Q 30/02 705/14.73 |
| 2008/0228928 | A1* | 9/2008 | Donelli | G06F 17/30029 709/228 |
| 2010/0169681 | A1* | 7/2010 | Wong | G06F 1/3228 713/320 |
| 2010/0332993 | A1* | 12/2010 | Bousseton | G06Q 30/02 715/738 |
| 2011/0184813 | A1 | 7/2011 | Barnes et al. | |
| 2012/0233540 | A1* | 9/2012 | Collet | G06F 17/2247 715/234 |
| 2014/0365564 | A1* | 12/2014 | Krishnamurthy | G06F 17/30905 709/203 |
| 2015/0188889 | A1* | 7/2015 | Lawson | H04L 63/0272 726/15 |
| 2015/0371267 | A1* | 12/2015 | Porat | G06Q 30/0269 705/14.55 |

OTHER PUBLICATIONS

Adblock Plus:Writing AdBlock Plus filters, Dated Aug. 20, 2006, https://web.archive.org/web/20060820173524/http://adblockplus.org/en/filters.*

Adguard: How to create filters, Dated May 13, 2012, https://web.archive.org/web/20120513085901/http://adguard.com/en/filter-rules.html.*

* cited by examiner

AD BLOCKING PAGE DISPLAY METHOD AND DEVICE

CROSS-REFERENCES TO RELATED APPLICATIONS

This application is a national stage of PCT Patent Application PCT/CN2013/076595, filed on May 31, 2013, which claims the priority of Chinese Patent Application No. 201210177700.9, filed on May 31, 2012, the entire contents of all of which are incorporated herein by reference.

FIELD OF THE INVENTION

The present invention generally relates to the field of communication and, more particularly, to a method and device to display pages.

BACKGROUND

Currently, when using a mobile terminal to browse a page, usually a large number of advertisements appear on the page. FIG. 1 is a schematic diagram of the page display of the Tianya Club home page according to the related art. FIG. 2 is a schematic diagram of the page display of the Sina home page according to the related art. As shown in FIG. 1 and FIG. 2, the loading of these advertisements not only slows down the page display (see the blank portion in a circled region shown in FIG. 2) but also generates additional traffic. The ad filtering function of browsers filters advertisements and saves traffic. For example, Firefox browser's ADBlock plug-in is available on mobile terminal to filter advertisements. Adblock intercepts HTTP requests according to the source addresses of the contents and is capable of filtering iframe, script and flash. It can also be used to automatically generate a user style sheet to hide page elements including text ads. This function is called element hiding, which replaces the intercepted contents with hidden contents. Because the adblock is implemented in javascript, after the ad filtering function is enabled in Firefox browser, its page loading speed becomes even slower than that without ad filtering function. Although the ad filtering function helps users to get rid of ads and to save traffic, it also slows down the page loading speed of browsers and affects the user's experience of webpage browsing.

BRIEF SUMMARY OF THE INVENTION

The present invention provides a page display method and device to solve at least the problem in the related art that loading the advertisements in the target page not only slows down the page the page display speed but also generates additional traffic.

One aspect of the present invention provides a page display method.

The page display method according to the present invention includes: in response to a click operation on a browser by a user, updating, by the browser, a current page display rule according to parameters downloaded from a server corresponding to the browser, and classifying and parsing the updated display rule; receiving, by the browser, a text from a target page, wherein the text contains tag strings used for displaying the target page; when the browser parses a predetermined tag string in the tag strings, invoking, by the browser, the classified and parsed page display rule corresponding to the predetermined tag string to display the page.

Preferably, in response to the click operation on the browser by a user, updating, by the browser, the current page display rule according to the parameters downloaded from the server corresponding to the browser, and classifying and parsing the updated page display rule, further includes: retrieving, by the browser, the current page display rules; updating, by the browser, the current page display rules according to the parameters; classifying, by the browser, the updated page display rules; and after classifying the page display rules, parsing, by the browser, the updated page display rules according to parsing methods corresponding to the classifications, retrieving and saving the classified and parsed page display rules corresponding to the predetermined tag strings.

Preferably, when the browser parses the predetermined tag string, invoking the classified and parsed page display rule corresponding to the predetermined tag string to display the target page further includes: determining, by the browser, page elements required to display in the target page according to the classified and parsed page display rules corresponding to the predetermined tag strings; and displaying, by the browser, the determined page elements required to display.

Preferably, the predetermined tag string includes at least one of: a link tag string, an image tag string, an iframe tag string, and a js tag string Preferably, when the predetermined tag string is a link tag string, the page display rule corresponding to the link tag string is a CSS rule, invoking the classified and parsed page display rule corresponding to the predetermined tag string to display the target page further includes: determining, by the browser, the CSS rule corresponding to a primary domain name in the CSS rule set according to the primary domain name of the target page, and generating a CSS statement; and displaying, by the browser, the page elements other than those corresponding to the primary domain name of the target page.

Preferably, when the predetermined tag string is an image tag string, an iframe tag string or a js tag string, the page display rule corresponding to the image tag string, the iframe tag string or the js tag string is at least one of a whitelist rule and a blacklist rule, invoking the classified and parsed page display rule corresponding to the predetermined tag string to display the target page further includes: determining, by the browser, the predetermined tag string that a uniform resource locator (URL) in the predetermined tag string does not match the corresponding whitelist rule and/or blacklist rule; displaying, by the browser, the page elements corresponding to the determined predetermined tag string.

Preferably, using the page display rules defined in the table below:

| Syntax | Semantics | Processing |
|---|---|---|
| @@ | whitelist indicator | removed after recognition |
| \| \| | automatic matching of domain names and sub domain names | replaced with \:VV([^V ]+\.)? |
| \| (preceding rule) | URL with rule prefix | replaced with ^ |
| \| (succeeding rule) | URL with rule suffix | replaced with $ |
| ## | CSS rule indicator | removed after recognition |

Another aspect of the present invention provides a page display device.

The page display device according to the present invention includes: a processing module configured to respond a click operation on a browser by a user, to update a current page display rule according to parameters downloaded from the server corresponding to the browser, and to classify and parse the updated page display rule; a receiver module configured to receive text from the target page, wherein the text contains tag strings for displaying the target page; and a display module configured to, when parsing a predetermined tag string in the tag strings, invoke the classified and parsed page display rule corresponding to the predetermined tag string and to display the target page.

Preferably, the processing module includes: an acquisition unit configured to acquire the current page display rule; an updating unit configured to update the current page display rule using the parameters; a classification unit configured to classify the updated page display rule; and a parsing unit configured to parse the classified page display rule according to the parsing method corresponding to the classified category, acquire the classified and parsed page display rules corresponding to the predetermined tag string and save the rules.

Preferably, the display module includes: a first determining unit configured to determine the page elements required to display in the target page according to the classified and parsed page display rules corresponding to the predetermined tag string; and a display unit configured to display the determined page elements required to display.

Preferably, the predetermined tag string includes at least one of: a link tag string, an image tag string, an iframe tag string, and a js tag string Preferably, the display module includes: a second determining unit configured to determine the page display rule corresponding to the link tag string as the CSS rule; a first determining unit configured to determine the CSS rule corresponding to the primary domain name in the CSS rule set according to the primary domain name of the target page and generate the CSS statements; and a display unit configured to display the other page elements other than the page elements corresponding to the CSS statements.

Preferably, the display module includes: a second determining unit configured to determine, when the predetermined tag string is an image tag string, an iframe tag string or a js tag string, the page display rule corresponding to the image tag string, iframe tag string, or the js tag string as the whitelist rule and/or the blacklist rule; a first determining unit configured to determine the predetermined tag string that the uniform resource locator (URL) in the predetermined tag string does not match the whitelist rule and/or blacklist rule; and a display unit configured to display the page elements corresponding to the predetermined tag string determined by the first determining unit.

Another aspect of the present invention provides a computer program, which can be executed by a computing device to implement the page display methods of the present invention.

Another aspect of the present invention provides a computer readable medium storing processor-executable program code, when being executed, for the processor to perform a page display method comprising: in response to a click operation on a browser by a user, updating, by the browser, a current page display rule according to parameters downloaded from a server corresponding to the browser, and classifying and parsing the updated display rule; receiving, by the browser, a text from a target page, wherein the text contains a tag string used for displaying the target page; when the browser parses a predetermined tag string in the tag strings, invoking, by the browser, the classified and parsed page display rule corresponding to the predetermined tag string to display the page.

According to the method of the present invention, the page display rules can be preset and downloaded from the server to the browser of the mobile terminal. In the target page text, the predetermined tag string is used to invoke the preset page display rules. When the page parser parses the predetermined tag string, the page display rule corresponding to the predetermined tag string is used to display the target page and filter out unnecessary page elements such as advertisements on the target page. This process solves the problem in the related art that loading the advertisements on the target page not only slows down the page display speed but also generates additional traffic, accelerates the display speed of the target page, saves traffic, and improves user experience.

BRIEF DESCRIPTION OF THE DRAWINGS

The drawings described hereinafter are used to provide further understanding of the present invention and constitute a part of this application. The exemplary embodiments of the present invention and their descriptions are used to explain the present invention and do not constitute undue limitations on the present invention. In the drawings.

DETAILED DESCRIPTION

The followings, together with accompanying drawings, describe in detail certain embodiments of the present invention. It should be noted that, when there is no conflict, the disclosed embodiments and features in the embodiments may be combined among one another.

Figure 1:
FIG. 1 illustrates a screen shot of the page display of the Tianya Club home page according to the related art.
Figure 2:
FIG. 2 illustrates a screen shot of the page display of the Sina home page according to the related art.
Figure 3:
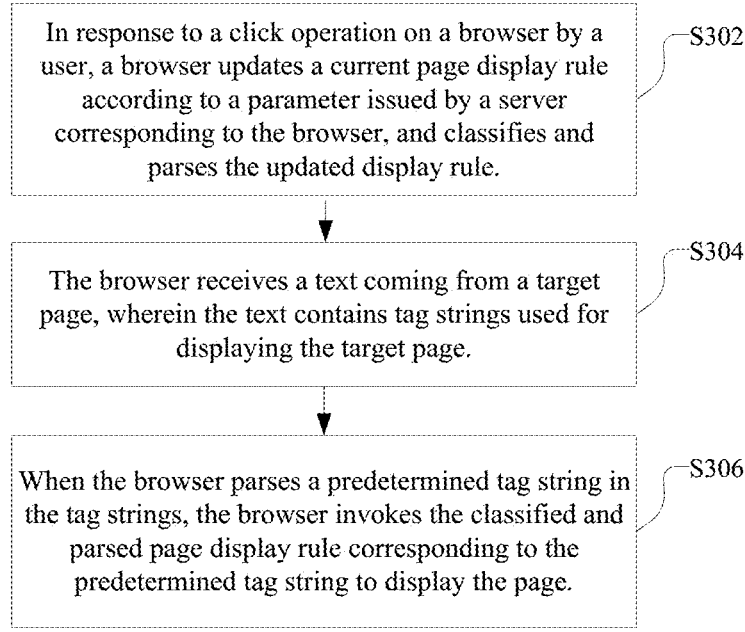
FIG. 3 illustrates a flow chart of a page display method according to the embodiments of the present invention.

FIG. 3 illustrates a flow chart of the page display method according to the embodiments of the invention. As shown in FIG. 3, the method may include the following steps:

Step S302, in response to click operation on the browser by a user, a browser updates a current page display rule according to parameters issued by a server corresponding to the browser, and classifies and parses the updated display rule;

Step S304, the browser receives a text from a target page, wherein the text contains tag strings used for displaying the target page;

Step S306, when the browser parses a predetermined tag string in the tag strings, the browser invokes the classified and parsed page display rule corresponding to the predetermined tag string to display the page.

In the related art, loading the unnecessary page elements such as advertisements on the target page not only slows down the page displaying speed but also generates additional traffic. Using the method shown in FIG. 3, the page display rules (e.g., hiding the page elements related to advertisements, whether to load the image page elements) can be preset and downloaded from the server to the browser of the mobile terminal. The browser uses the page display rules downloaded from the server to update the locally stored page display rules and, at the same time, performs classification and parsing. In the target page text, the predetermined tag string is used to invoke the preset page display rules. When the page parser parses the predetermined tag string, the page display rule corresponding to the predetermined tag string is used to display the target page and filter out unnecessary page elements such as advertisements on the target page. This process solves the problem in the related art that loading the advertisements on the target page not only slows down the page display speed but also generates additional traffic, accelerates the display speed of the target page, saves traffic, improves user experience, and lets users browse contents on more concise pages with faster display speed.

In the preferred embodiment, the above page display rules can be a string, which may include, but is not limited to some custom meanings and the standard regular expressions.

The following preferred embodiments further illustrate the page display rules.

All cascading style sheets (hereinafter referred to as CSS) rules contain two "#". All whitelist rules start with "@@". All other rules belong to blacklist rules. For example:

Example One (general CSS rule): ##.topADS

This rule refers to that for all pages, the nodes with class attribute topADS are hidden away.

Example Two (specific CSS rule): sina.com.cn##.topAD

This rule refers to that for the pages with sin.com.cn domain name, the nodes with class attribute topAD need to be hidden away. This is a specific rule.

Example Three (specific pages unaffected CSS rule): ~earlyamerica.com##.topads

This rule refers to that excluding the pages with earlyamerica.com domain name, the nodes with class attribute topads need to be hidden away. This is a semi-specific rule.

Example Four (blacklist rule): ||nsclick.baidu.com^

This rule refers to a standard regular expression. All strings that match the regular expression are considered as satisfying this rule. For example, the image www.nsclick.baidu.com/img2.gif is filtered out.

Example Five (whitelist rule): @@baidu.com/postjs$domain=tieba.baidu.com

This rule refers to that the website elements under domain name tieba.baidu.com are not filtered out even if they satisfy the regular expression baidu.com/post.js.

It should be noted that, in addition to the above page display rules, some other rules can also be defined. For example: whether the primary domain name and the domain name requesting resources are identical can be used to determine whether the resource request belongs to a third party, details of which are not described here.

In a preferred embodiment, a local rule file is placed inside the installation package, including the initial ad filtering rules. When the program starts, two parameters (adblock_del_rule and adblock_add_rule), representing local rule deletion and local rule addition, respectively, are downloaded from the server. The value of each parameter consists of a string of rules separated by "!". During the initialization of the browser, these two parameters are used to modify the local rule file. After the rule file modification is completed, the new rule file is parsed. Before starting parsing the rule file, if the rule file is not modified and its backup data exists on the disk, the cached data of the match results are retrieved from the disk. The cached data are saved into the disk after matching occurrences.

Preferably, the above step S302, in response to the click operation on the browser by the user, the browser updates the current page display rule according to the parameters downloaded from the server corresponding to the browser, and classifies and parses the updated page display rule, may contain the following processing steps:

Step S1: the browser retrieves the current page display rules;

Step S2: the browser updates the current page display rules according to the parameters;

Step S3: the browser classifies the updated page display rules;

Step S4: the browser, after classifying the page display rules, parses the rules according to the parsing methods corresponding to the classifications, retrieves and saves the classified and parsed page display rules corresponding to the predetermined tag strings.

Figure 4:
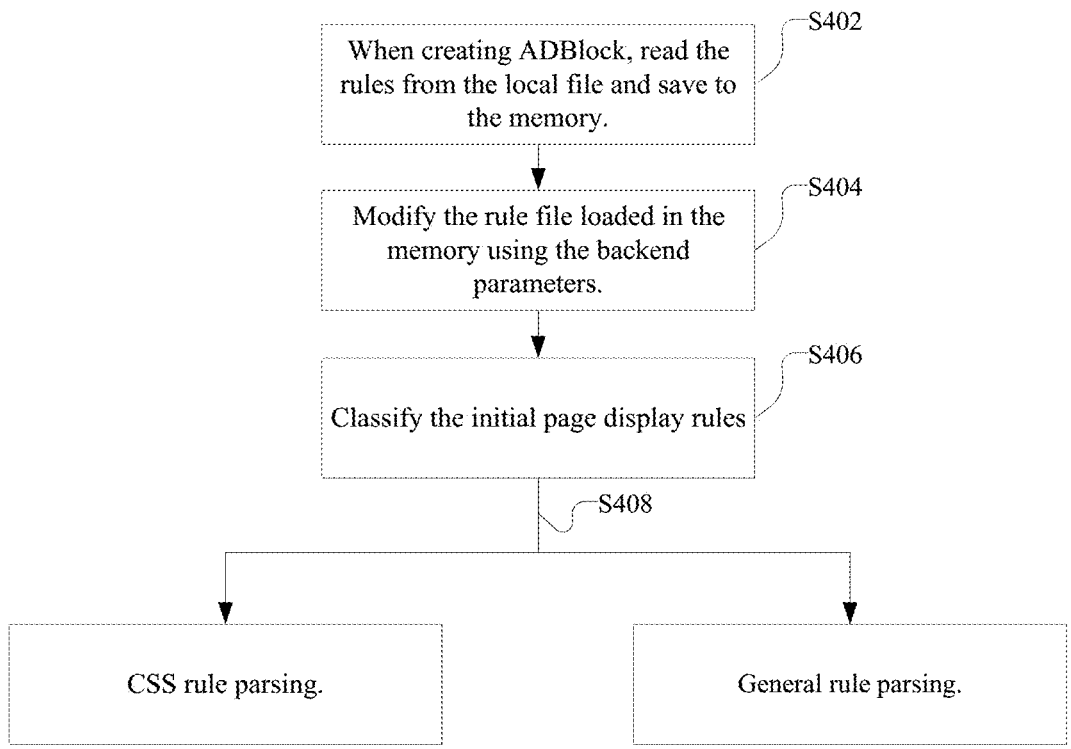
FIG. 4 illustrates a flow chart of acquiring the page display rule corresponding to the predetermined tag string according to the embodiments of the present invention.

The following further describes the above preferred embodiment together with FIG. 4.

FIG. 4 illustrates a flow chart of acquiring the page display rule corresponding to the predetermined tag string according to the embodiment of the present invention. As shown in FIG. 4, the process may include the following steps:

Step S402: when creating ADBlock, reading the page display rules from the local file to the memory;

Step S404: during the browser initialization, modifying the local rule file according to the initial page display rules downloaded from the server;

Step S406: classify the initial page display rules;

In a preferred embodiment, rule categories are recognized according to the characteristics of each rule, and are dispatched into three string sets which include a CSS rule string set, a whitelist rule string set, and a blacklist rule string set.

Step S408: parsing the classified page display rules according to the parsing methods corresponding to the classifications, retrieving and saving the page display rules corresponding to the predetermined tag strings.

In a preferred embodiment, after the classification, the CSS rules, whitelist rules and blacklist rules are parsed. Because the principle of whitelist and blacklist rules is the same and only the effects are defined differently, adding "@@" prefix to a blacklist converts it into a whitelist. Thus, both have the same parsing method.

Parsing the CSS rules: for example, for parsing the rule ~baidu.com,sina.com.cn##.topAD, first separating the character string by "##" into ~baidu.com,sina.com.cn and .topAD, where the former indicates the scope of the rule; and then separating the scope by "," into ~baidu.com and sina.com.cn. The prefix "~" indicates the websites under the domain name are exempted from the CSS rules. So the domain name is recorded in the exemption hash table. The websites under domain name sina.com.cn are subject to the CSS rules. So the domain name sina.com.cn is recorded in the scope hash table. Therefore each CSS rule records the pages within its scope and the pages out of its scope. If there is nothing in front of "##", then the CSS rule applies to all pages.

Parsing the general rules (e.g., whitelist and blacklist): for example, for parsing the rule ||nsclick.baidu.com^, the prefix "||" in this rule is a custom syntax notation, indicating it can match any prefixes such as www, http://, and https://.nsclick.baidu.com^ is a standard regular expression statement, indicating it matches any character strings of nsclick.baidu.com appended with any character string of any length. When being parsed, the custom syntax statements are eventually replaced by the corresponding regular expression statements. The custom syntax is illustrated as in Table 1 below.

TABLE 1

| Syntax | Semantics | Processing |
| --- | --- | --- |
| @@ | whitelist indicator | removed after recognition |
| \|\| | automatic matching of domain names and sub domain names | replaced with \:\/\/([^\/ ]+\.)? |
| \| (preceding rule) | URL with rule prefix | replaced with ^ |
| \| (succeeding rule) | URL with rule suffix | replaced with $ |
| ## | CSS rule indicator | removed after recognition |

Other than these custom syntax rules, any other characters appeared in the rules are subject to standard regular expression syntax.

After being parsed, the CSS rule sets are expressed in the following format:

```
FilterSet{
Int m_type           //indicating whether this is a CSS rule set or a general rule set
Bool m_isWhiteList   //indicating whether this is a whitelist rule set
HashMap<string HashMap<int, bool>*>       //rule exemption domain name record
HashMap<string, Vector<ADBlockFilter*>*>       //domain name and its scope record
}
```

Preferably, the above step S306, when the browser parses the predetermined tag string, invokes the classified and parsed page display rule corresponding to the predetermined tag string to display the target page, and may include the following operations:

Step S1: the browser determines the page elements required to display in the target page according to the classified and parsed page display rules corresponding to the predetermined tag strings;

Step S2: the browser displays the determined page elements required to display.

In a preferred embodiment, after the parsing the classified page display rules, the parsed CSS rule set, the whitelist rule set, and the blacklist rule set are generated. Each rule object in the rule sets has already been parsed and can be directly used to match the uniform resource locators (URLs). Before start, a section of cache memory is reserved to save the matched requests in the form of <URL, BOOL>. In the meantime, a timer starts and the new match results are written into the rule file every 30 seconds. The match results which have already been written into the rule file are flagged to avoid duplicated disk writings. At the start of the program, the cached records in the disk are loaded into the memory so that the cached records can be directly accessed and the processing speed can be greatly accelerated. Using the caching technology enables the instant match of the correct results when the user opens the same page multiple times. In the meantime, taking into account the rule file modification initiated from the server side, after discovering that the server modifies the rule file, the system deletes the previously cached match results.

In a preferred embodiment, the predetermined tag strings may include but are not limited to one of the following: link tag strings, image tag strings, iframe tag strings, and js tag strings, etc.

Preferably, when the predetermined tag string is a link tag string, the page display rule corresponding to the link tag string is the CSS rule. In the step S306 that the browser invokes the classified and parsed page display rule corresponding to the predetermined tag string to display the target page, the system may include the following steps:

Step S1: the browser determines the CSS rule corresponding to the primary domain name in the CSS rule set according to the primary domain name of the target page, and generates a CSS statement;

Step S2: the browser displays the page elements other than those corresponding to the primary domain name of the target page.

Figure 5:
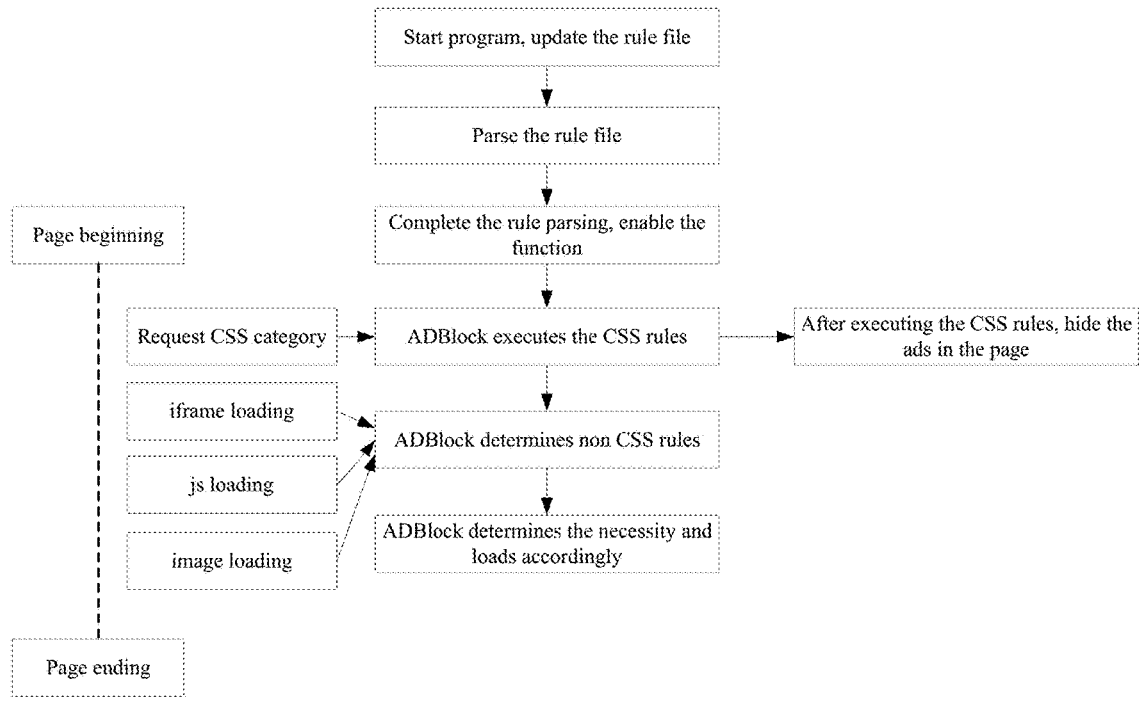
FIG. 5 illustrates a block diagram of the page display rule parsing according to the preferred embodiments of the present invention.

In the preferred embodiment, as shown in FIG. 5, when the user opens the target page, the system first looks up the corresponding CSS rule subset (including: overall CSS rules and domain name specific CSS rules) in the CSS rule set according to the primary domain name of the target page. The lookup is straightforward because the CSS rules, when being parsed, have already been classified according to the domain names. It can be implemented through character string comparison. For example, for the domain name sina.com.cn, the lookup finds the following rule subset:

Sina.com.cn##.topAD
News.sina.com.cn###divResNewsBottom
which generates a CSS statement:
.topAD, #divResNewsBottom{display:none} (This is a standard CSS style statement, which means that elements with the id as topAD or with the class as divResNewsBottom are hidden away.)

Finally, the system may insert a <link> tag inside the body tag through the kernel, import the CSS rule into the page, apply the CSS rule to the current page, and achieve the desired effect of hiding ads inside the page.

Preferably, when the predetermined tag string is an image tag string, an iframe tag string or a js tag string, the page display rule corresponding to the image tag string, the iframe tag string or the js tag string is whitelist rule and/or blacklist rule. In step S306 that the browser invokes the classified and parsed page display rule corresponding to the predetermined tag string to display the target page, the system may include the following steps:

Step S1: the browser determines the predetermined tag string that the uniform resource locator (URL) in the predetermined tag string does not match the whitelist rule and/or blacklist rule;

Step S2: the browser displays the page elements corresponding to the verified predetermined tag string.

In the preferred embodiment, as shown in FIG. 5, after hiding the ads in the page, the page parsing process constantly generates the iframe, image and js network requests. Before issuing such network requests, the system feeds the category and its corresponding URL to the filter, which returns a bool value to indicate whether to permit such network requests by the resource.

For example, an image, when the page parser parses a tag <img src=www.baidu.com/img1.jpg>, creates an element HTMLImageElement, and loads the image from the given src address. If the filter determines that the image should not be loaded, it returns a "false". Upon receiving the returned "false", the page parser does not respond to the network request by the image and deletes the element HTMLImageElement from the page. Similarly, the same process applies to iframe and js.

In a preferred embodiment, the decision logic for a URL is as follows:

First matching in the whitelist. If the whitelist returns a "true", then the URL is not filtered out. If the whitelist returns a "false", then matching in the blacklist. If the blacklist returns a "true", then the URL is filtered out. If the blacklist returns a "false", then the URL is not filtered out.

In a preferred embodiment, each decision on a URL creates a record in the form of <URL, bool>. When a user opens the same page, the ads filter looks up the URL in its cache. If the URL has a record in the cache, then the bool value is simply returned and there is no need to find any rule match. In the meantime, taking the account of saving memory space, for example, the maximum of 2,000 URL match records are retained. If the maximum is reached, a new match record replaces the last match record in the cache.

Figure 6:
FIG. 6 illustrates a screen shot of the page display of the Tianya Club home page according to the preferred embodiments of the present invention.
Figure 7:
FIG. 7 illustrates a screen shot of the page display of the Sina home page according to the preferred embodiments of the present invention.

The following further describes the above preferred embodiment in the context of FIG. 6 and FIG. 7.

FIG. 6 illustrates a screen shot of the page display of the Tianya Club home page according to the preferred embodiments of the present invention. As shown in FIG. 6, opening the page www.tianya.cn only displays a simple login and registration page while a large amount of ads in the page are hidden away. The loading of the unnecessary page elements such as advertisement images can be effectively prevented. When performing tests under the conditions that the cache is deleted and the ads filtering function is enabled, ipad2 takes 1.8 seconds to load the page in a wifi environment. In the related art, the same test takes 2.3 seconds to load the page. Thus, the present invention improves the user experience.

FIG. 7 illustrates a screen shot of the page display of the Sina home page according to the preferred embodiments of the present invention. As shown in FIG. 7, in the related art, when opening the page www.sina.com.cn, the top section of the page which belongs to advertisements is embedded in the page and is downloaded along with the main document. There is no way to block the ads section downloading. The ads filtering function of the present invention (i.e. the CSS rule) can hide the ads section. The processed page has faster display speed, saves more traffic and makes the page look more concise.

Figure 8:
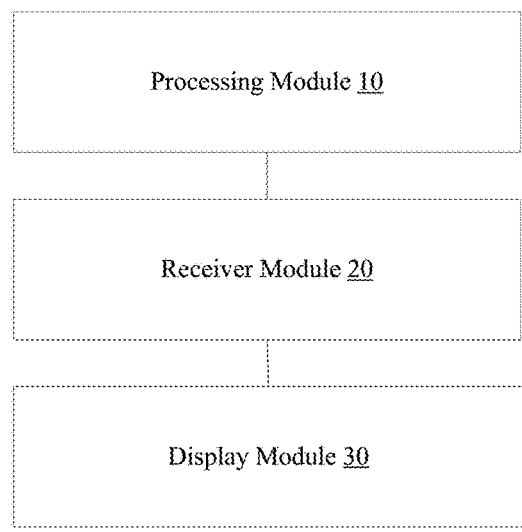
FIG. 8 illustrates a block diagram of a page display device according to the embodiments of the present invention.

FIG. 8 illustrates a block diagram of a page display device according to the embodiment of the present invention. As shown in FIG. 8, the page display device may include: a processing module 10 used to respond the click operation on the browser by a user, update the current page display rule according to the parameters downloaded from the server corresponding to the browser, classify and parse the updated page display rule; a receiver module 20 used to receive the text from the target page, wherein the text contains the tag string for displaying the target page; a display module 30 used to, when parsing the predetermined tag string in the tag strings, invoke the classified and parsed page display rule corresponding to the predetermined tag string and display the target page.

Using the device shown in FIG. 8 solves the problem in the related art that loading the ads in the target page not only slows down the page display speed but also generates additional traffic. The device accelerates the display speed of the target page, saves the traffic, improves the user experience, and lets the user browse the contents on the faster displayed and more concise pages.

Figure 9:
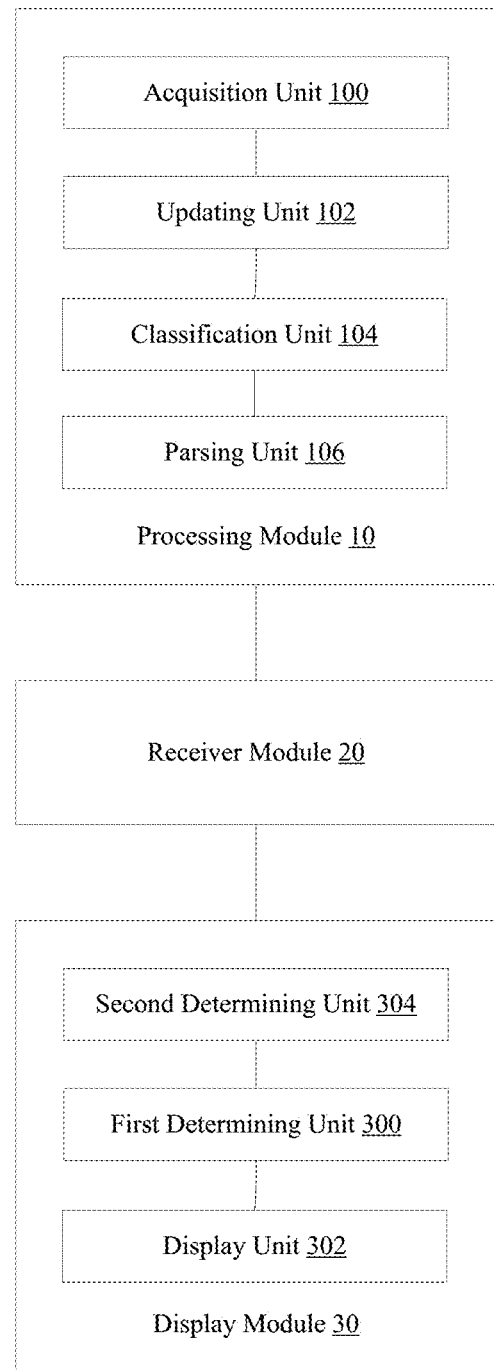
FIG. 9 illustrates a block diagram of a page display device according to the preferred embodiments of the present invention.

Preferably, as shown in FIG. 9, the processing module 10 may include: an acquisition unit 100 used to acquire the current page display rule; an updating unit 102 used to update the current page display rule using the parameters; a classification unit 104 used to classify the updated page display rule; a parsing unit 106 used to parse the classified page display rule according to the parsing method corresponding to the classified category, to acquire the classified and parsed page display rules corresponding to the predetermined tag string, and to save the rules.

Preferably, as shown in FIG. 9, the display module 30 may include: a first determining unit 300 used to determine the page elements required to display in the target page according to the classified and parsed page display rules corresponding to the predetermined tag string; and a display unit 302 used to display the verified page elements required to display.

In a preferred embodiment, the predetermined tag string may include but is not limited to one of the following: a link tag string, an image tag string, an iframe tag string, and a js tag string.

Preferably, as shown in FIG. 9, the display module 30 may also include: a second determining unit 304 used to determine the page display rule corresponding to the link tag string as the CSS rule. The first determining unit 300 is also used to determine the CSS rule corresponding to the primary domain name in the CSS rule set according to the primary domain name of the target page and generate the CSS statements; and the display unit 302 is also used to display the other page elements besides the page elements corresponding to the CSS statements.

Preferably, as shown in FIG. 9, in the above display module 30, the second determining unit 304 is also used to determine, when the predetermined tag string is an image tag string, an iframe tag string or a js tag string, the page display rule corresponding to the image tag string, iframe tag string, or the js tag string as the whitelist rule and/or the blacklist rule; the first determining unit 300 is also used to determine the predetermined tag string that the uniform resource locator (URL) in the predetermined tag string does not match the whitelist rule and/or blacklist rule; and the display unit 302 is also used to display the page elements corresponding to the predetermined tag string determined by the first determining unit.

It should be noted that the preferred operating mode of interactions between the modules and the units in FIG. 8 and FIG. 9 may be referred to the embodiments shown in FIGS. 3 through 7 and is not described here.

The followings further describe the preferred embodiments by comparing the page display methods and devices according to the present invention with the Firefox third party plug-in ADBlock in the related art.

Currently among various browsers installed on mobile terminals, only the Firefox third party plug-in ADBlock implements the browser ads filtering function. However, enabling this function exposes that it reduces the browser's page display speed. The page display method and device according to the present invention have the following advantages.

The first advantage: the rule parsing method and the number of rules are optimized. ADBlock supports 20,000 rules, which is not subject to the user's control. Each network request triggers the matching of 20,000 rules. It is time consuming and wastes energy. The present invention analyzes the top 200 sites frequently visited by the user and extracts only 400 active rules (i.e. the number of rules currently usable in the rule file). It substantially reduces the time consumed in parsing the rules as well as the cost of rule matching.

The second advantage: as a third party plug-in, ADBlock has no control over page parsing process. It can only listen to the event beforeLoadEvent before the network request is made and act accordingly to block the loading of the resource. However, by then the browser has already performed many unnecessary operations such as creating elements, analyzing element attributes, configuring attributes, inspecting properties, sending redundant events, and so forth. The fact that the advertisement elements are deleted anyway makes the above operations totally useless, wasting time and resource. Directly implemented in the U3 kernel, the present invention prevents putting resources in further analyzing and loading at the early stage, effectively avoids unnecessary code execution, and does not perform the redundant operations on the advertisement elements to be deleted. It accelerates the page display speed and saves traffic.

The third advantage: the present invention uses caching technology such as memory cache, disk cache, etc. to accelerate the matching speed and reduce the amount of computation.

Table 2 shows the preliminary test results using the present invention.

Environment: wifi
Tool: ipad2 16 GB
Test condition: clear the browser cache before each page opening
Result analysis assumption: due to the changing network environment, the absolute measurements are not meaningful; only the relative difference between the two methods makes sense

TABLE 2

| Site | Time measurement with ads filtering off (unit: second) | Time measurement with ads filtering on (unit: second) |
|---|---|---|
| www.qidian.com | 13.43 | 9.33 |
| www.sina.com.cn | 21.62 | 15.62 |
| news.baidu.com | 7.25 | 5.09 |

It should be noted that the implementation of the present invention does not depend on a specific platform. Not only it can be quickly ported to any browsers based on U3 kernel platform. It can even be quickly ported to any browsers that support regular expression execution.

From the above descriptions, it can be seen that the embodiments achieve the following technical effects (it should be noted that such effects can be achieved by certain preferred embodiments): the page display speed is determined by the network speed of loading and the speed of page parsing and rendering. The technical solutions provided by the present invention effectively block the loading of unwanted page contents such as advertisements and save the time loading webpages. After the excessive ads elements are deleted, the speed of page parsing and rendering can be accelerated. Ultimately the effect of page display speed acceleration and traffic saving can be achieved. The entire user experience for page browsing can be improved in aspects such as network traffic, page cleanliness, and page display speed.

Obviously, it should be understood to those skilled in the art that the modules and processes of the present invention may be implemented on any generic computing device. They can be centralized on single computing device or distributed over multiple computing devices connected through a network. Optionally, they can be implemented in the programming code loaded on computing device so that they can be stored in the memory and executed by the computing device. Under certain circumstances, they can be executed in the sequence other than described above. Optionally, they can be implemented by multiple integrated circuit modules, or can be consolidated into single integrated circuit module. Therefore, the present invention is not limited to any particular hardware and/or software combination.

The above described are only preferred embodiments of the present invention and are not intended to limit the present invention. To those skilled in the art, the present invention may have various changes and variations. Within the spirit and principles of the present invention, any modification, equivalent replacement, improvement, etc., should be included in the scope of the protection of the present invention.

The invention claimed is:

1. A page display method, comprising:
in response to a click operation on a browser by a user,
retrieving, by a browser, current page display rules,
updating, by the browser, the current page display rules according to parameters downloaded from a server corresponding to the browser during an initialization of the browser,
classifying the updated page display rules into multiple string sets including a CSS rule string set, a whitelist rule string set, and a blacklist rule string set,
parsing the classified page display rules according to parsing methods corresponding to the classification,
retrieving and saving the classified and parsed page display rules by: matching each parsed rule object in the classified rule string sets to a corresponding uniform resource locator (URL); reserving a section of cache memory to save the matched requests a rule file as a form of <URL, BOOL>; flagging the match results in the rule file to avoid duplicated disk writings; and writing new match results into the rule file every fixed time period;
receiving, by the browser, a text from a target page, wherein the text contains tag strings used for displaying the target page; and
when the browser parses a predetermined tag string in the tag strings, invoking, by the browser, one classified and parsed page display rule corresponding to the predetermined tag string to display the page.

2. The method according to claim 1, wherein, when the browser parses the predetermined tag string, invoking the classified and parsed page display rule corresponding to the predetermined tag string to display the target page further includes:
determining, by the browser, page elements required to display in the target page according to the classified and parsed page display rules corresponding to the predetermined tag string; and displaying, by the browser, the determined page elements required to display;

wherein the predetermined tag string is one of a link tag string, an image tag string, an iframe tag string, and a js tag string.

3. The method according to claim 2, wherein, when the predetermined tag string is a link tag string, the page display rule corresponding to the link tag string is a CSS rule, invoking the classified and parsed page display rule corresponding to the predetermined tag string to display the target page further includes:

determining, by the browser, the CSS rule corresponding to a primary domain name in the CSS rule set according to the primary domain name of the target page, and generating a CSS statement; and displaying, by the browser, the page elements that do not correspond to the CSS statement.

4. The method according to claim 3, wherein determining the CSS rule corresponding to a primary domain name in the CSS rule including:

separating the link tag string by "##" and "," to obtain at least one domain name corresponding to the primary domain name;

if the at least one domain name has a prefix "~", recording the at least one domain name into an exemption hash table; and if the at least one domain name does not has a prefix "~", recording the at least one domain name into a scope hash table.

5. The method according to claim 2, wherein, when the predetermined tag string is an image tag string, an iframe tag string or a js tag string, the page display rule corresponding to the image tag string, the iframe tag string or the js tag string is at least one of a whitelist rule and a blacklist rule, invoking the classified and parsed page display rule corresponding to the predetermined tag string to display the target page further includes:

determining, by the browser, the predetermined tag string that a uniform resource locator (URL) in the predetermined tag string does not match the corresponding blacklist rule or matches the corresponding whitelist rule;

displaying, by the browser, the page elements corresponding to the determined predetermined tag string.

6. The method according to claim 1, wherein the page display rules are defined and parsed using the table below:

| Syntax | Semantics | Parsing Processing |
| --- | --- | --- |
| @@ | whitelist indicator | removed after recognition |
| \| \| | automatic matching of domain names and sub domain names | replaced with \:VV([^V ]+\.)? |
| \| (preceding rule) | URL with rule prefix | replaced with ^ |
| \| (succeeding rule) | URL with rule suffix | replaced with $ |
| ## | CSS rule indicator | removed after recognition. |

7. A page display device, comprising one or more processors, memory, and modules and units stored in the memory in which the modules and units are executed by the one or more processors, the device comprising:

a processing module configured to respond a click operation on a browser by a user, to acquire current page display rules by an acquisition unit, to update the current page display rules by an updating unit according to parameters downloaded from the server corresponding to the browser during an initialization of the browser, and to classify the updated page display rules, by a classification unit, into multiple string sets including a CSS rule string set, a whitelist rule string set, and a blacklist rule string set, and to parse the classified page display rules by a parsing unit according to the parsing method corresponding to the classification, retrieve and save the classified and parsed page display rules, wherein the parsing unit is further configured to: match each parsed rule object in the classified rule string sets to a corresponding uniform resource locator (URL); reserve a section of cache memory to save the matched requests a rule file as a form of <URL, BOOL>; flag the match results in the rule file to avoid duplicated disk writings; and write new match results into the rule file every fixed time period;

a receiver module configured to receive text from a target page, wherein the text contains tag strings for displaying the target page; and a display module configured to, when parsing a predetermined tag string in the tag strings, invoke the classified and parsed page display rule corresponding to the predetermined tag string and to display the target page.

8. The device according to claim 7, wherein the display module includes:

a first determining unit configured to determine the page elements required to display in the target page according to the classified and parsed page display rules corresponding to the predetermined tag string; and a display unit configured to display the determined page elements required to display;

wherein the predetermined tag string is one of a link tag string, an image tag string, an iframe tag string, and a js tag string.

9. The device according to claim 8, wherein the display module further includes:

a second determining unit configured to determine whether the page display rule corresponding to a link tag string is a CSS rule;

wherein the first determining unit is configured to determine a CSS rule corresponding to a primary domain name in the CSS rule string set according to the primary domain name of the target page and generate a CSS statement;

wherein the display unit is configured to display the page elements that do not correspond to the CSS statement.

10. The device according to claim 8, wherein the display module further includes:

a second determining unit configured to determine whether the page display rule corresponding to an image tag string, an iframe tag string, or a js tag string is at least one of a whitelist rule and a blacklist rule;

wherein the first determining unit is configured to determine the predetermined tag string that a uniform resource locator (URL) in the predetermined tag string does not match the blacklist rule or matches the whitelist rule; and wherein the display unit is configured to display the page elements corresponding to the predetermined tag string determined by the first determining unit.

11. A non-transitory computer readable medium storing processor-executable program code, when being executed, for the processor to perform a page display method comprising:

in response to a click operation on a browser by a user, retrieving, by a browser, current page display rules, updating, by the browser, the current page display rules according to parameters downloaded from a server corresponding to the browser during an initialization of the browser, classifying the updated page display rules into multiple string sets including a CSS rule string set, a whitelist rule string set, and a blacklist rule string set, parsing the classified page display rules according to parsing methods corresponding to the classification, retrieving and saving the classified and parsed page display rules by: matching each parsed rule object in the classified rule string sets to a corresponding uniform resource locator (URL); reserving a section of cache memory to save the matched requests a rule file as a form of <URL, BOOL>; flagging the match results in the rule file to avoid duplicated disk writings; and writing new match results into the rule file every fixed time period;

receiving, by the browser, a text from a target page, wherein the text contains tag strings used for displaying the target page; and when the browser parses a predetermined tag string in the tag strings, invoking, by the browser, one classified and parsed page display rule corresponding to the predetermined tag string to display the page.

12. The non-transitory computer readable medium according to claim 11, wherein, when the browser parses the predetermined tag string, invoking the classified and parsed page display rule corresponding to the predetermined tag string to display the target page further includes:

determining, by the browser, page elements required to display in the target page according to the classified and parsed page display rules corresponding to the predetermined tag string; and displaying, by the browser, the determined page elements required to display;

wherein the predetermined tag string is one of a link tag string, an image tag string, an iframe tag string, and a js tag string.

13. The non-transitory computer readable medium according to claim 12, wherein, when the predetermined tag string is a link tag string, the page display rule corresponding to the link tag string is a CSS rule, invoking the classified and parsed page display rule corresponding to the predetermined tag string to display the target page further includes:

determining, by the browser, the CSS rule corresponding to a primary domain name in the CSS rule set according to the primary domain name of the target page, and generating a CSS statement; and displaying, by the browser, the page elements that do not correspond to the CSS statement.

14. The non-transitory computer readable medium according to claim 12, wherein, when the predetermined tag string is an image tag string, an iframe tag string or a js tag string, the page display rule corresponding to the image tag string, the iframe tag string or the js tag string is at least one of a whitelist rule and a blacklist rule, invoking the classified and parsed page display rule corresponding to the predetermined tag string to display the target page further includes:

determining, by the browser, the predetermined tag string that a uniform resource locator (URL) in the predetermined tag string does not match the corresponding blacklist rule or matches the corresponding whitelist rule;

displaying, by the browser, the page elements corresponding to the determined predetermined tag string.

* * * * *